(No Model.)  3 Sheets—Sheet 1.

S. HEMINGWAY.
HOP PICKING MACHINE.

No. 566,173. Patented Aug. 18, 1896.

Witnesses
C. M. Sweeney
Geo. B. Whiting

Inventor
Sylvanus Hemingway
by H. Chapman
Attorney (No Model.) 3 Sheets—Sheet 2.

S. HEMINGWAY.
HOP PICKING MACHINE.

No. 566,173. Patented Aug. 18, 1896.

Witnesses
Inventor (No Model.) 3 Sheets—Sheet 3.
S. HEMINGWAY.
HOP PICKING MACHINE.
No. 566,173. Patented Aug. 18, 1896.
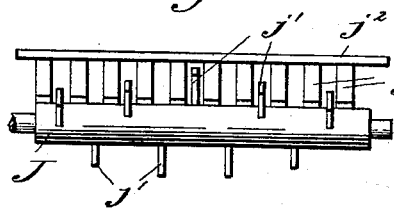
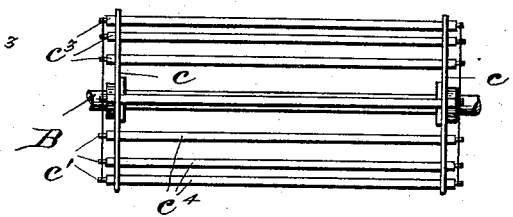
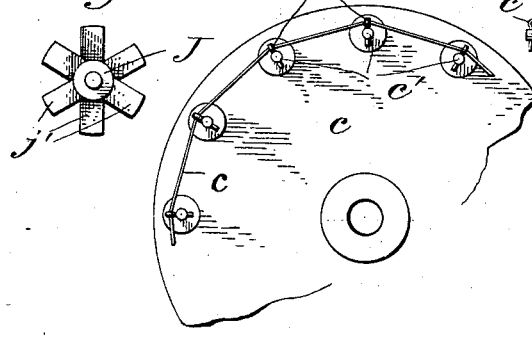
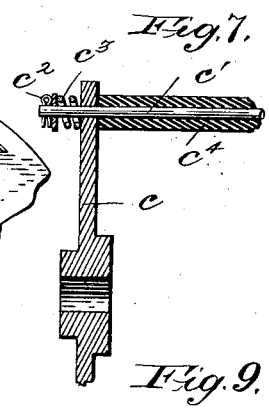
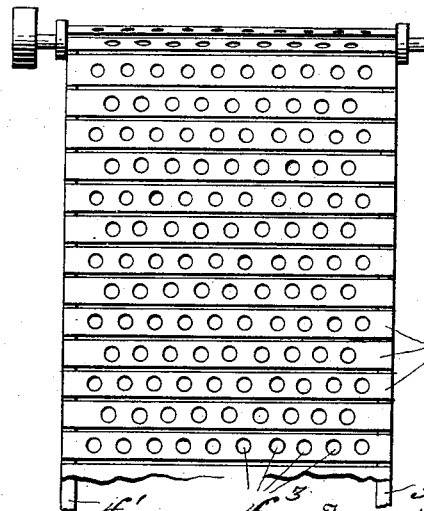
Witnesses
C. M. Sweeney
Geo. B. Whiting
Inventor
Sylvanus Hemingway
by F. A. Cushman
Attorney

UNITED STATES PATENT OFFICE.

SYLVANUS HEMINGWAY, OF POTSDAM, NEW YORK.

HOP-PICKING MACHINE.

SPECIFICATION forming part of Letters Patent No. 566,173, dated August 18, 1896.

Application filed February 7, 1896. Serial No. 578,347. (No model.)

*To all whom it may concern:*

Be it known that I, SYLVANUS HEMINGWAY, a citizen of the United States, residing at Potsdam, in the county of St. Lawrence and State of New York, have invented certain new and useful Improvements in Hop-Picking Machines; and I do hereby declare the following to be a full, clear, and exact description of the invention, such as will enable others skilled in the art to which it appertains to make and use the same.

My invention relates to hop-picking machines, and has for its object to provide a machine which will perform the work which has heretofore been done, to a large extent, by hand-picking.

My improved hop-picking machine has a capacity for work which makes it possible for a large harvest of hops to be picked and prepared for market in a comparatively short space of time, thereby overcoming one of the difficulties experienced by hop-growers, who, on account of the comparatively short season for picking the hops and the scarcity of help, are frequently put to serious inconvenience in the preparation of the product for the market.

In carrying out my invention I have borne in mind the necessity of providing a machine which would strip the hops from the vines without crushing the flowers but which would preserve the blossom entire. It will be observed also that my invention as embodied in the machine presented in the present application will thoroughly clean the hops after they have been stripped from the vines, separating the leaves which may have been torn from the vines from the hop-blossoms, which latter will be deposited in suitable receptacles, while the refuse will be deposited at either end of the machine.

Other points of novelty will appear hereinafter, and the particular features of novelty on which I desire protection will be pointed out in the claims appended hereunto.

Figure 1:
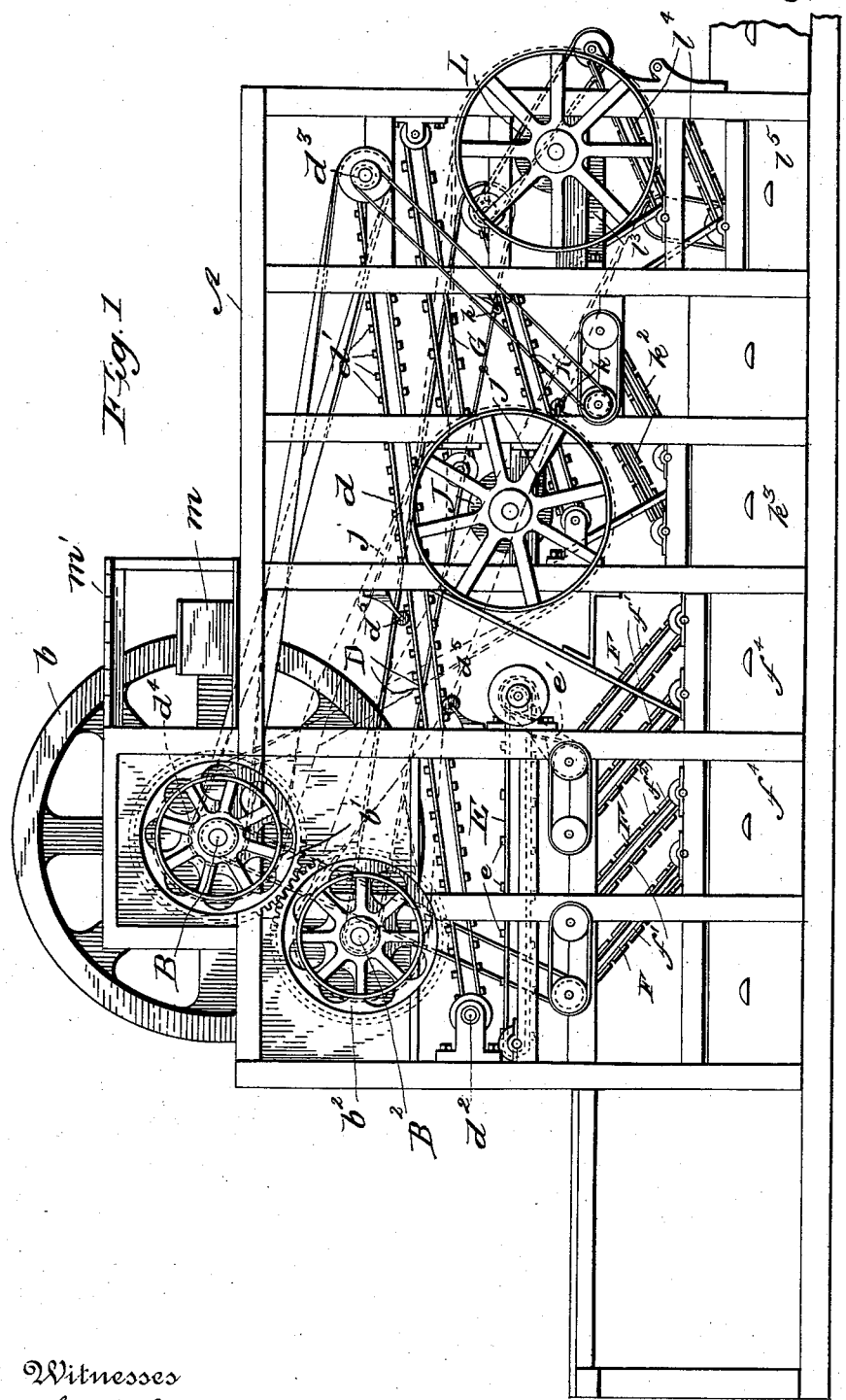
Figure 2:
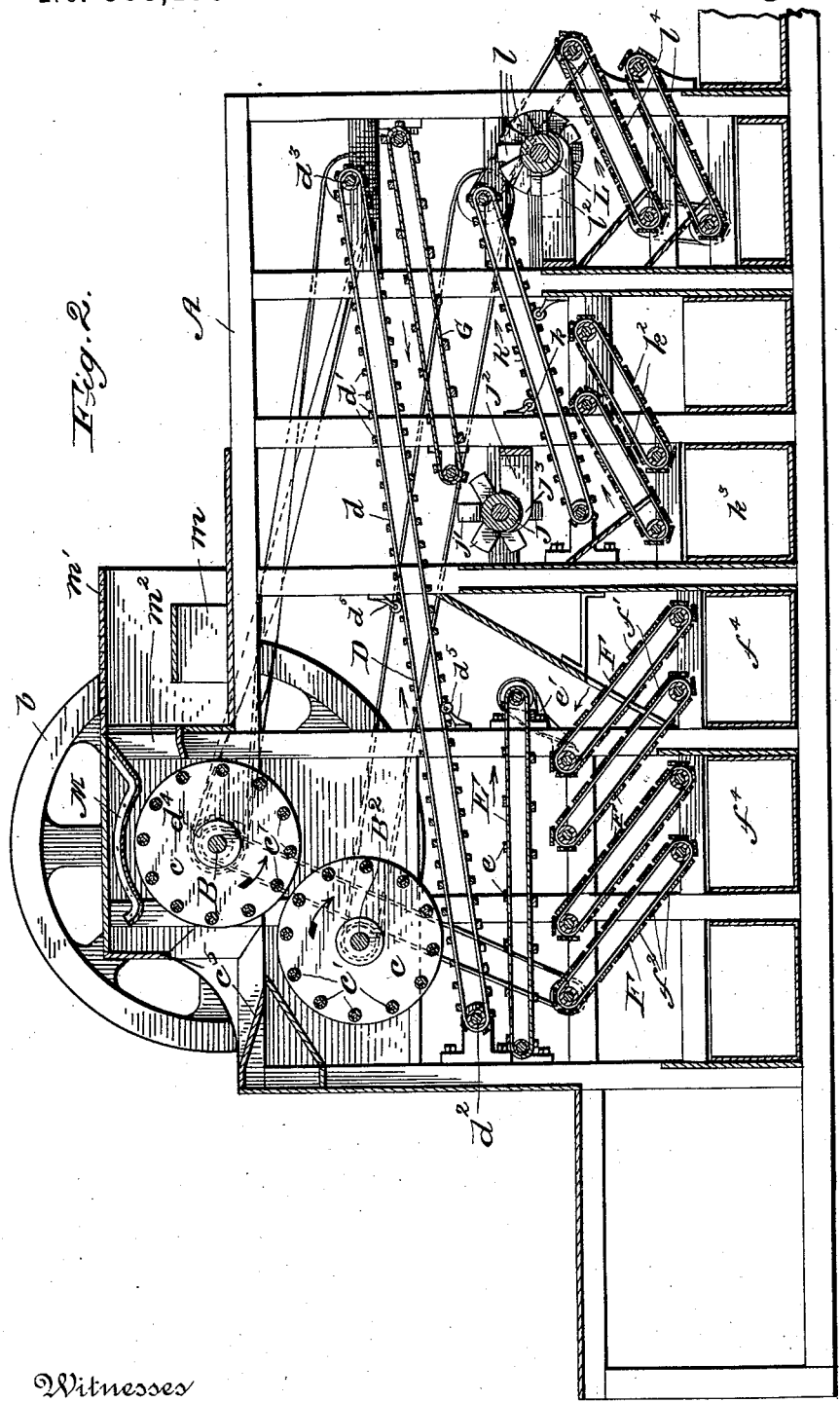

Referring to the accompanying drawings, Figure 1 is a side view of my improved hop-picking machine. Fig. 2 is a vertical longitudinal sectional view. Fig. 3 is a detail view of one of the stripping-cylinders and comb.
Fig. 4 is an end view of the cylinder shown in Fig. 3. Fig. 5 is a detail view of one of the picking-cylinders. Figs. 6 and 7 are detail views of portions of said cylinders. Figs. 8 and 9 are detail views of portions of the shaking-screen and cleaning-belts, respectively.

Referring to the drawings by letter, A denotes the rectangular frame of the machine, said frame being made of suitable uprights and horizontal beams, as shown, upon which, if desired, boards may be fastened to inclose the mechanism carried by the frame. Mounted in bearings in the upper part of said frame A near one end thereof is the main shaft B of the machine, having secured to one end the driving-pulley $b$ and provided at its other end with a gear-wheel $b'$. Rigidly secured to the shaft B, so as to revolve therewith, is one of the main picking-cylinders, said cylinder comprising the heads $c$, which carry stripping-rods $c'$. Said stripping-rods $c'$ pass through apertures in the heads $c$ and are held in place by spring-pins $c^2$, and I preferably pass a wire $c^5$ through said spring-pins to prevent the rods from turning and slipping on the vines. Encircling said rods $c'$ between the spring-pins $c^2$ and the heads $c$ are cushioning devices $c^3$, which may be rubber blocks, as shown in Fig. 5, or spiral springs, as shown in Fig. 7. The object of providing the cushions $c^3$ is to allow said rods $c'$ to "give" as the hop-vines pass between them and similar rods $c'$ on a second picking-cylinder mounted on a shaft just below the picking-cylinder just described, as shown in Fig. 3. This second picking-cylinder is identical in construction with the one just described and receives its motion from the gear-wheel $b'$ on the shaft B, which meshes with the gear-wheel $b^2$ on the shaft $B^2$, which carries the second picking-cylinder.

In order that the stripping-rods $c'$ on the picking-cylinders may not crush the hop-blossoms or break the vines as they are fed into the machine, I preferably cover said rods with rubber $c^4$, which, while not affecting the stripping action of said rods on the vines, reduces the probability of injuring the blossoms to a minimum.

By reference to Fig. 2 it will be seen that as the vines are fed into the machine the flower will be caught by the rubber-covered stripping-rods $c'$, be pinched from the vine, and will fall upon the screening-belt below, which belt I shall now describe in detail. I provide the guards $c^5$ at the feed-opening of the machine in order to guide the vines and prevent their being entangled in the cylinders as they are fed in. Immediately beneath said picking-cylinders is mounted a traveling screen D, which extends nearly the entire length of the machine. Said screen D is composed of a series of narrow longitudinally-placed belts $d$ and transverse wooden strips $d'$, so arranged as to form a latticed screen, as clearly shown in Fig. 9. Said belt D is mounted on shafts $d^2$ $d^3$, said shaft $d^3$ being belted to a pulley $d^4$ on the main shaft B and driven thereby. In order to give the necessary vibratory movement to the traveling screen D, I place small wheels $d^5$ about midway its length, against which the transverse strips $d'$ strike as the screen D is driven and give to the latter a shaking movement. Below the shaking-screen D, I locate a carrier-belt E on which the hop-flowers and the few leaves which are stripped from the vines by the picking-cylinders and screened by the shaking-screen D fall. Said belt E consists of a broad strip of canvas or other suitable material having cleats $e$ placed at intervals thereon, and is driven by a belt $e'$ from a pulley on one of the shafts of a gang of cleaning-belts located just below the carrier-belt E. I have shown four of these cleaning-belts F, which are set at an angle of about forty degrees to the horizontal and are driven by a belt $f$ from the main shaft B of the machine, all of said belts F traveling in the direction of the arrows, Fig. 1. Said belts F consist of longitudinal supporting-straps $f'$, to which are secured wooden strips $f^2$, placed a short distance apart, so as to leave transverse cracks or slits, and having openings $f^3$ through them, said openings being disposed as shown at Fig. 9. These cleaning-belts F empty into receptacles $f^4$ at the base of the machine, as seen in Fig. 1. It will be seen that the hop-blossoms are delivered by the carrier-belt E to the cleaning-belt of the inclined series just referred to which is farthest to the right, Fig. 1. As the hops fall upon said belt they will, owing to their cylindrical form and the smooth surface of the belt F, roll down the same into the receptacle below, and any loose hop-scales which may have become detached will pass through the openings $f^3$ into the receptacles. The leaves, however, will be carried up and thrown onto the next cleaning-belt together with the hop-flowers which were not separated by the first cleaning operation, and so on through the entire series of cleaning-belts, the leaves and refuse being carried along by one belt after another and finally deposited at the front of the machine.

I have found that it frequently happens that clusters of the hop-flowers and short sections of the vines are broken off by the action of the picking-cylinders and are also fed in with the mass of vines as they are introduced into the machine which are too large to pass through the meshes of the shaking-screen D, and I have provided the means for stripping and breaking up such clusters, which I shall now describe.

Located beneath the rear end of the screen D is a canvas carrier-belt G, similar in all respects to the belt E described above, said belt G being driven by a belt $g$ from a pulley $g'$ on one of the shafts of a shaking-screen K just below said carrier-belt G. The hop-clusters which do not pass through said screen D are delivered to the carrier G and by it carried to a stripping or breaking cylinder J, driven by a belt $j$ (see dotted lines, Fig. 1) from the shaft B. Said cylinder J is provided with a series of radiating blades $j'$, said blades being offset from one another, as shown in Figs. 4 and 5. The blades $j'$ are offset so that they pass between the teeth of the comb $j^2$ in succession and do not strike in a gang, as better results and smoother action are obtained by thus offsetting the blades. Said radial blades $j'$ coöperate with a stripping-comb $j^2$, between the teeth $j^3$ of which the blades $j'$ pass, thus thoroughly breaking up the vine-sections and clusters which are delivered by the carrier G. A shaking-screen K, identical in construction with the screen D described above, is located just below said stripping-cylinder J, said screen K being vibrated by small wheels $k$, similar to screen D. Cleaning-belts $k^2$ receive the hop-blossoms from said shaking-screen K and after cleaning them in the manner described in connection with the cleaning-belts F deposit them in a receptacle $k^3$ at the bottom of the machine.

At the extreme end of the machine at the rear I place a second stripping-cylinder L, similar in construction to the cylinder J just described, except that the blades $l$ of this second cylinder L are closer together than those on the cylinder J and the teeth $l^2$ of the comb $l^3$, which coöperates with the cylinder L, are finer than those on comb $j^2$. The said cylinder L is so placed that any hop-clusters which are not broken up by the action of the first stripping-cylinder are delivered to said second cylinder by the shaking-screen K. Two cleaning-belts $l^4$ are placed below this last stripping-cylinder to clean the hops which fall thereon and deposit them in the receptacle $l^5$, while the refuse is thrown off by the last belt at the rear of the machine.

I have found that it frequently happens that sections of the vines are broken off by the picking-cylinders and carried along by the shaking-screen D which are too large to be fed to the toothed stripping-cylinders J and L, and I have therefore provided a concave plate M, which is placed just above the upper picking-cylinder in close proximity thereto, said concave plate M, in connection with the upper picking-cylinder, serving as an auxiliary picking mechanism to which the vine-sections which are too large for the stripping-cylinders J and L are fed. I provide a seat $m$ for an attendant and a table $m'$ close to the auxiliary feed-opening $m^2$. The vine-sections are passed up to the attendant, who feeds them to the auxiliary picking mechanism, by a second attendant, who sorts and picks out the larger vine-sections from the shaking-screen D. It will be seen that this auxiliary picking mechanism can be used without interfering with the main picking-cylinders and the work will be greatly facilitated and the capacity of the machine increased.

As I have described the operation of the several mechanisms embodied in the machine as I have given their construction, I do not think it necessary to recapitulate by describing at length the combined operations. The hop-vines are fed in at the front of the machine, the tops being thrust in first, and are drawn in by the action of the picking-cylinders. I preferably do not feed the vines completely through the machine, but draw them out after they have passed in far enough to effectually strip the blossoms, since by doing this the large leaves which usually grow at the base of the vines are not taken into the machine and do not, therefore, have to be cleaned out by the cleaning-belts.

I claim—

1. In a machine of the class described, the combination with two rotating picking-cylinders, provided with yielding stripping-arms, of a traveling screen beneath said picking-cylinders, means for shaking said screen, a traveling carrier-belt beneath said screen to receive the screened products, and inclined cleaning-belts to which said products are delivered by the carrier, substantially as set forth.

2. In a machine of the class described, the combination with a pair of rotating picking-cylinders, of a traveling screen, means for shaking said screen, a carrier-belt below said screen to receive the screened products, and a gang of inclined transversely-slitted cleaning-belts to which said products are delivered by said carrier-belt, substantially as described.

3. In a machine of the class described, the combination with a suitable supporting-frame, of picking-cylinders mounted in said frame, a traveling screen, means for shaking said screen, a carrier-belt to receive the screened products from said traveling screen, inclined cleaning-belts to which the carrier-belt delivers the screened products, and stripping mechanism to which the unscreened products are delivered by the said traveling screen, substantially as described.

4. In a machine of the class described, the combination with a suitable supporting-frame, of picking-cylinders mounted therein, and provided with longitudinally-movable, non-rotatable stripping-rods, of a traveling screen beneath said cylinders, means for shaking said screen, a carrier-belt for the screened products, a gang of inclined cleaning-belts below said carrier-belt, and a stripping cylinder and comb to which the unscreened products are delivered by the said traveling screen, substantially as described.

5. A picking-cylinder for hop-picking machines, comprising two heads rigidly secured to a supporting-shaft, and a series of stripping-rods mounted in said heads so as to have longitudinal movement, but secured against rotation substantially as described.

6. A picking-cylinder for hop-picking machines provided with a series of non-rotatable stripping-rods, and springs $c^3$ on said rods, whereby the latter have a limited longitudinal movement.

7. A picking-cylinder for hop-picking machines, comprising supporting-heads rigidly secured to a suitable shaft, and a series of spring-held, rubber-covered, stripping-rods mounted in said heads, and means for securing said rods against rotation substantially as described.

8. In a machine of the class described, the combination with picking, screening, and cleaning mechanisms, of an auxiliary stripping mechanism consisting of a revolving cylinder having a series of offset radially-disposed blades, and a stationary comb or stripping-plate between the teeth of which said radial blades pass, substantially as described.

9. In a machine of the class described, the combination with the picking-cylinders, of a traveling shaking-screen, a carrier-belt beneath said screen, and a gang of inclined, perforated cleaning-belts, said belts having transverse cracks or slits at short intervals substantially as described.

10. In a machine of the class described, the combination with the picking-cylinders, of a traveling shaking-screen, a carrier-belt beneath one end of the said screen, a gang of cleaning-belts below said carrier-belt, a second carrier-belt beneath the other end of said shaking-screen, a revolving stripping-cylinder to which said second carrier-belt delivers the unscreened products, a stationary comb which coöperates with said stripping-cylinder, and perforated cleaning-belts beneath said stripping-cylinder and comb, said cleaning-belts having smooth exterior faces and being provided with transverse cracks or slits substantially as described.

11. In a machine of the class described, the combination with the picking-cylinders, of a traveling screen below the same, means for shaking said screen, a carrier-belt below one end of said screen to receive the screened products, cleaning-belts below said carrier-belt, a second carrier-belt beneath the other end of said shaking-screen to receive the unscreened products from said traveling shaking-screen, auxiliary stripping mechanism of varying degrees of fineness to which the unscreened products are delivered by the second carrier-belt, and cleaning-belts coöperating with said auxiliary stripping mechanisms, substantially as described.

12. In a hop-picking machine, the combination with the picking-cylinders, of an imperforate, curved plate fixed to the machine-frame in close proximity to one of said picking-cylinders and coöperating with said cylinder to strip the hops from the vines.

In testimony whereof I affix my signature in presence of two witnesses.

SYLVANUS HEMINGWAY.

Witnesses:
    HARRY P. BARNHARD,
    ROBT. BREWER.